United States Patent [19]

Watanabe

[11] Patent Number: 4,604,946
[45] Date of Patent: Aug. 12, 1986

[54] STRUCTURE OF DEFROSTER NOZZLE FOR AUTOMOTIVE VEHICLE

[75] Inventor: Takeaki Watanabe, Ebina, Japan

[73] Assignee: Nissan Motor Company, Limited, Yokohama, Japan

[21] Appl. No.: 734,688

[22] Filed: May 16, 1985

[30] Foreign Application Priority Data

May 25, 1984 [JP] Japan .................... 59-104793

[51] Int. Cl.⁴ .............................................. B60H 1/00
[52] U.S. Cl. .................................. 98/2.09; 98/2.19
[58] Field of Search .................... 98/2.08, 2.09, 2.19, 98/2.04, 2.01

[56] References Cited

U.S. PATENT DOCUMENTS

| 1,752,615 | 4/1930 | Roof | 98/2.09 X |
| 1,936,776 | 11/1933 | Swain | 98/2.09 |
| 2,677,155 | 5/1954 | Wise | 98/2.09 |
| 3,927,607 | 12/1975 | Jobst | 98/2.09 |

FOREIGN PATENT DOCUMENTS 59-18073  1/1984  Japan .

Primary Examiner—Lloyd L. King
Attorney, Agent, or Firm—Schwartz, Jeffery, Schwaab, Mack, Blumenthal & Evans

[57] ABSTRACT

A structure of a defroster nozzle for an automotive vehicle includes a nozzle port having an elongated air outlet and a number of holes through which collars are inserted to accommodate screws for attaching an instrument panel to a vehicle body. The nozzle port extends along the entire width of the windshield so as to evenly defog the windshield.

6 Claims, 9 Drawing Figures

STRUCTURE OF DEFROSTER NOZZLE FOR AUTOMOTIVE VEHICLE

BACKGROUND OF THE INVENTION

1. Field of the Invention

The present invention relates to the structure of a defroster nozzle for an automotive vehicle.

2. Description of the Prior Art

A conventional defroster nozzle for an automotive vehicle is exemplified by Japanese Patent Application Unexamined Open No. Sho. 59-18,073.

FIGS. 3 through 6 show this typical, conventional defroster.

FIG. 3 is a front view thereof, FIGS. 4 and 5 are sectional views showing how it is installed in the vehicle, and FIG. 6 is a diagram of the inside of a windshield with the defroster nozzle working in defrost mode.

In these Figures, the symbol N denotes a whole defroster nozzle, numeral 1 denotes a nozzle outlet, numeral 2 denotes a connection of the nozzle outlet 1 with a heater unit U, i.e., air conditioner, and numeral 3 denotes a duct directing air flow from the heater unit U to the nozzle outlet 1 via the connection 2.

As shown in FIG. 3, the nozzle outlet 1 comprises a total of five nozzle ports aligned laterally across a dashboard just below a windshield 10. Numeral 4 denotes recesses between each nozzle port. As shown in FIG. 5, the recesses 4 provide room for the attachments T of an instrument panel P to a vehicle body 5. The above-described attachments T each of them comprises: a first bracket 6 attached to a dash panel, i.e., vehicle body 5, a second bracket 7 integral with the instrument panel P, and a mounting screw 8 by which the first and second brackets 6, 7 are fixed together. It should be noted that the defroster nozzle N itself is attached to the vehicle body 5 (not shown) via a stay. Furthermore, numeral 9 denotes a defroster garnish and numeral 10 denotes the windshield.

As described above, since the conventional structure of the defroster nozzle N includes a plurality of recesses 4 allowing room for the attachments T of the vehicle body 5 to the instrument panel P, heated air from the heater unit U exits via the five nozzle ports but is lacking over the recesses 4.

Therefore, there arises a problem in that the parts of the windshield 10 over the recesses 4 are not readily defrosted so that the windshield 10 exhibits a serpentine interface between the uncleared, foggy area S and the cleared area, as represented by the solid line of FIG. 6, thus disturbing the driver's view of the outside and requiring an inconveniently long time to defog the entire windshield 10.

SUMMARY OF THE INVENTION

With the above-described problem in mind, it is an object of the present invention to provide a defroster nozzle structure for an automotive vehicle which can defog the entire windshield quickly while ensuring a uniformly clear view of the outside.

The object can be achieved by providing a defroster nozzle structure which comprises means for directing heated air derived from air heating means of the vehicle uniformly along the entire lower edge of a rear surface of a windshield the heated air directing means comprising a nozzle port and duct for directing air flow from the air heating means to the nozzle port, wherein the nozzle port and the duct extend along substantially the lower edge of the rear surface of the windshield and comprise a single, continuous elongated shape, and means passing through a part of the air-directing means for attaching an instrument panel to a portion of a vehicle body which is also in contact with the lower edge of the windshield.

BRIEF DESCRIPTION OF THE DRAWINGS

A more complete understanding of the present invention may be obtained by the foregoing detailed description in conjunction with the drawings in which like reference numerals and symbols designate corresponding elements and in which.

DETAILED DESCRIPTION OF THE PREFERRED EMBODIMENT

Figure 1A:
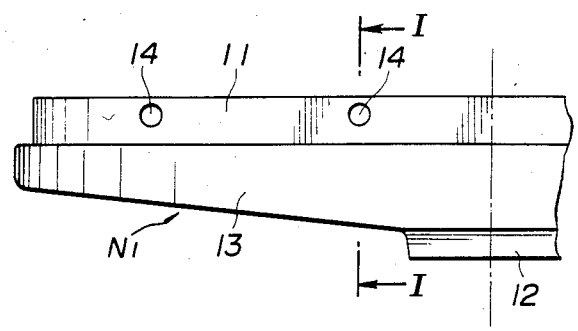
FIGS. 1(A), 1(B), and 1(C) are a front elevation, a plan view, and a cross-section through a defroster nozzle of a preferred embodiment along a line (I)—(I) of FIG. 1(A)

Reference will be made to the drawings in order to facilitate understanding of the present invention.

FIGS. 1(A) through 1(C) and FIG. 2 show a preferred embodiment of the present invention.

In these drawings, symbol $N_1$ denotes a defroster nozzle, numeral 11 denotes a nozzle port, numeral 12 denotes the connection between the nozzle port and heater unit U, and numeral 13 denotes a duct directing air flow from the heater unit U to the nozzle port 11 via connection 12.

Figure 1B:
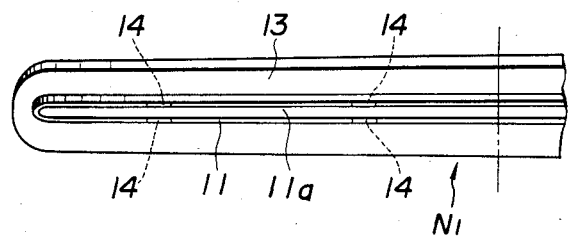
Figure 1C:
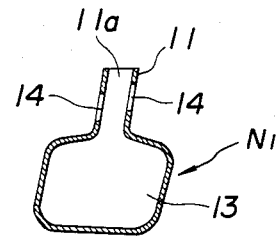
Figure 2:
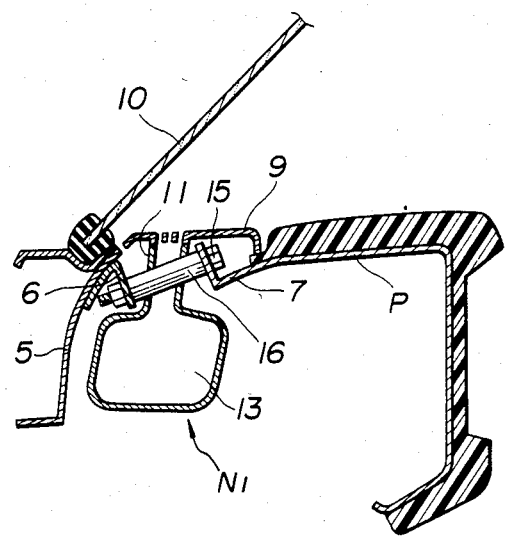
FIG. 2 is a cross-section through an assembled dashboard of a vehicle employing the present invention, the section being made in the same plane as in FIG. 1(c)
Figure 3:
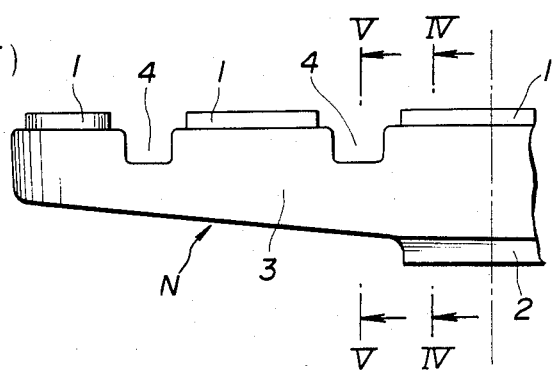
FIG. 3 is a front elevation of a conventional defroster nozzle.
Figure 4:
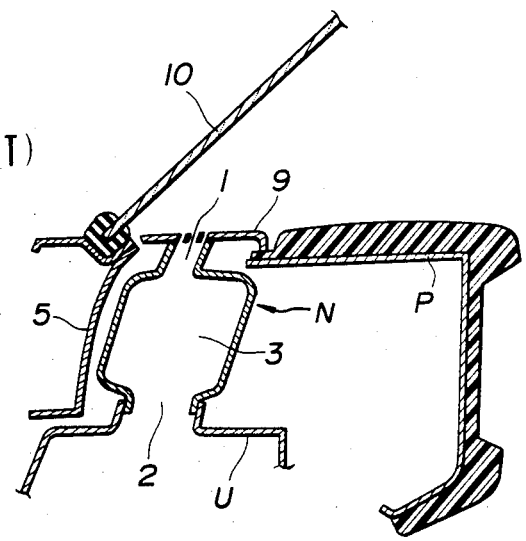
FIG. 4 is a cross-section of the conventional defroster nozzle shown in FIG. 3 taken along line (IV)—(IV) of FIG. 3.
Figure 5:
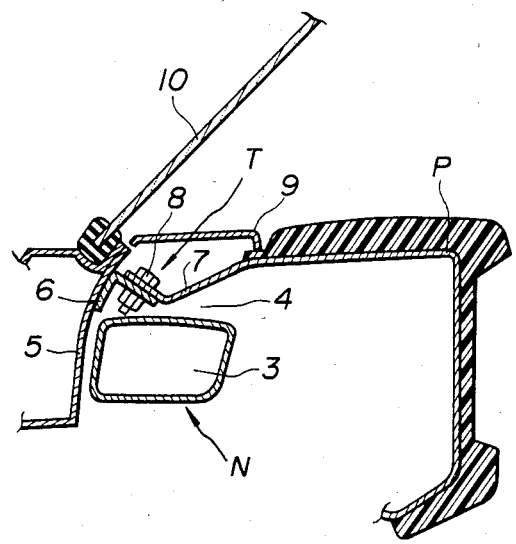
FIG. 5 is a cross-section of the conventional defroster nozzle cut away along a line (V)—(V) of FIG. 3.

The above-mentioned nozzle port 11 has an outlet 11a in the form of a laterally elongated slot. As shown in FIGS. 1(A) through 1(C), a series of spaced holes cross the outlet 11a. Each hole 14 allows insertion of a collar 16 through which a screw 15 is threaded for the purpose of attaching the instrument panel P to the vehicle body 5, as shown in FIG. 2.

Figure 1D:
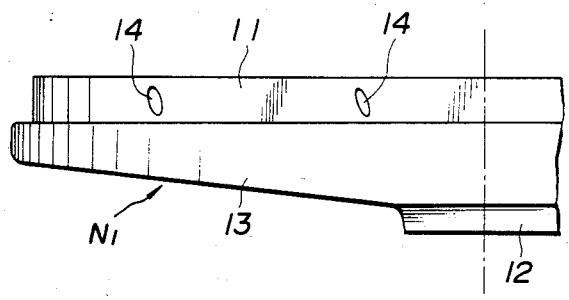
FIG. 1(D) is a front elevation of a variation of a hole shown in FIG. 1(A)

Each hole 14 is of circular cross-section to accommodate a cylindrical collar 16. As shown in FIG. 1(D), it is also possible to use elliptical holes and collars so as to minimize resistance against direction and quantity of air flow through the duct 13 toward the windshield 10. Although in this embodiment there are four holes, two on each side of the instrument panel P, it is possible to use any desired number according to the mounting strength of the panel P.

Techniques used to attach the defroster nozzle $N_1$ to the vehicle body 5 will be described below.

First, collars 16 are inserted respectively through the corresponding holes 14 of the defroster nozzle $N_1$. Screws 15 are passed through threaded holes in the bracket 7 of the instrument panel P and through collars 15 then are screwed and tightly into nuts welded onto the bracket 6.

In this way, the defroster nozzle N₁ is fixed to the vehicle body 5 together with the instrument panel P by means of the collar 16.

Figure 6:
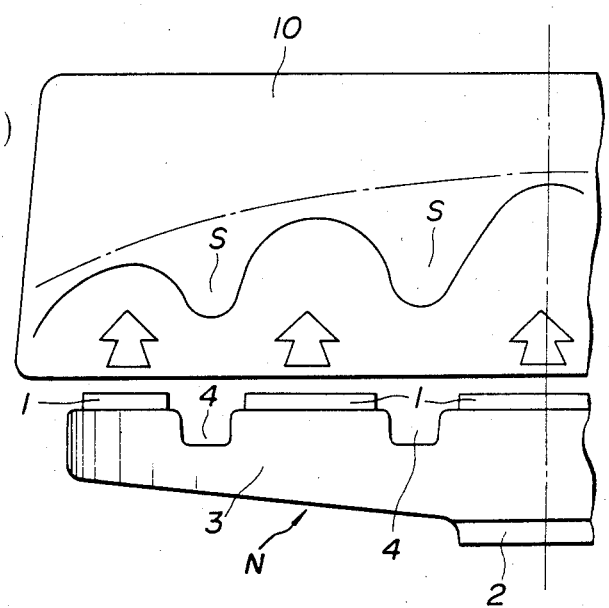
FIG. 6 is a diagram of a windshield and the conventional defroster nozzle illustrating the effect of the defroster nozzle according to the present invention.

With this arrangement, the air flow from the heater unit through the duct 13 is disturbed only slightly by the collars 16 but the outlet 11a of the nozzle port 11 can put out a uniform and continuous sheet of heated air. The defrosting airstream crosses the windshield essentially symmetrically about the central connection 12 so that the defogged windshield area has a smooth, convex interface as represented by the dot-and-dash line of FIG. 6. Hence, the structure of the defroster nozzle described above eliminates the disturbing serpentine defogging pattern shown in solid line in FIG. 6.

As described above, since the structure of the defroster nozzle according to the present invention has the nozzle port with a single, continuous outlet slot crossed by an appropriate number of holes through which collars are inserted to allow screws to attach the instrument panel P to the vehicle body 5, air from the heater unit can exit uniformly along the entire length of the nozzle port so that the windshield can be evenly defogged across its entire width, allowing vehicle occupants to clearly view the outside.

It will be clearly appreciated by those skilled in the art that the foregoing description is in terms of a preferred embodiment and various changes and modifications may be made without departing from the scope of the present invention which is to be defined by the appended claims.

What is claimed is:

1. A structure of a defroster nozzle for an automotive vehicle, comprising:
   (a) means for directing heated air derived from air heating means of the vehicle along the entire lower edge of a rear surface of a windshield, said heated air directing means comprising a nozzle port and duct for directing air flow from said air heating means to said nozzle port, wherein said nozzle port and said duct extend along substantially the lower edge of the rear surface of the windshield and comprise a single, continuous elongated shape; and
   (b) means passing through a part of said air-directing means for attaching an instrument panel to a portion of a vehicle body.

2. The structure of the defroster nozzle as set forth in claim 1, wherein said instrument panel attaching means comprises at least one pair of holes penetrating said nozzle port, a collar inserted through said pair of holes, and a fastener inserted through said collar for fixing the instrument panel to the portion of the vehicle body disposed opposite said nozzle port from the instrument panel.

3. A structure of a defroster nozzle for an automotive vehicle, comprising:
   (a) a nozzle port having a single, elongated air outlet extending continuously along substantially the lower edge of a rear surface of a windshield, said air outlet extending along a length of the windshield which includes at least one cleaning zone defined by the action of one windshield wiper and an area of the windshield outside said cleaning zone;
   (b) a connection integral to said nozzle port between air heating means and said nozzle port;
   (c) a hole penetrating the walls of said nozzle port and through which a collar is inserted; and
   (d) a screw passing through said collar for attaching an instrument panel to a vehicle body.

4. The structure of the defroster nozzle as set forth in claim 3, wherein a plurality of holes penetrate the walls of said nozzle port and accommodate cylindrical collars.

5. The structure of the defroster nozzle as set forth in claim 4, wherein said holes and cylindrical collars are elliptical in cross-section, the major axis of said cross-section being essentially parallel to the direction of air flow through said nozzle port.

6. A structure of a defroster nozzle as set forth in claim 3, which further comprises a duct linked between said nozzle port and said connection, for directing heated air from said air heating means to said nozzle port, wherein said nozzle port and said duct extend along substantially the entire edge of a rear surface of the windshield.

* * * * *